Aug. 15, 1967          J. CZULAK ET AL          3,336,099
APPARATUS FOR THE SANITIZATION OF LIQUIDS WITH
ESPECIAL APPLICATION TO WATER STORAGES
AND SWIMMING POOLS

Filed Jan. 23, 1964                2 Sheets-Sheet 1

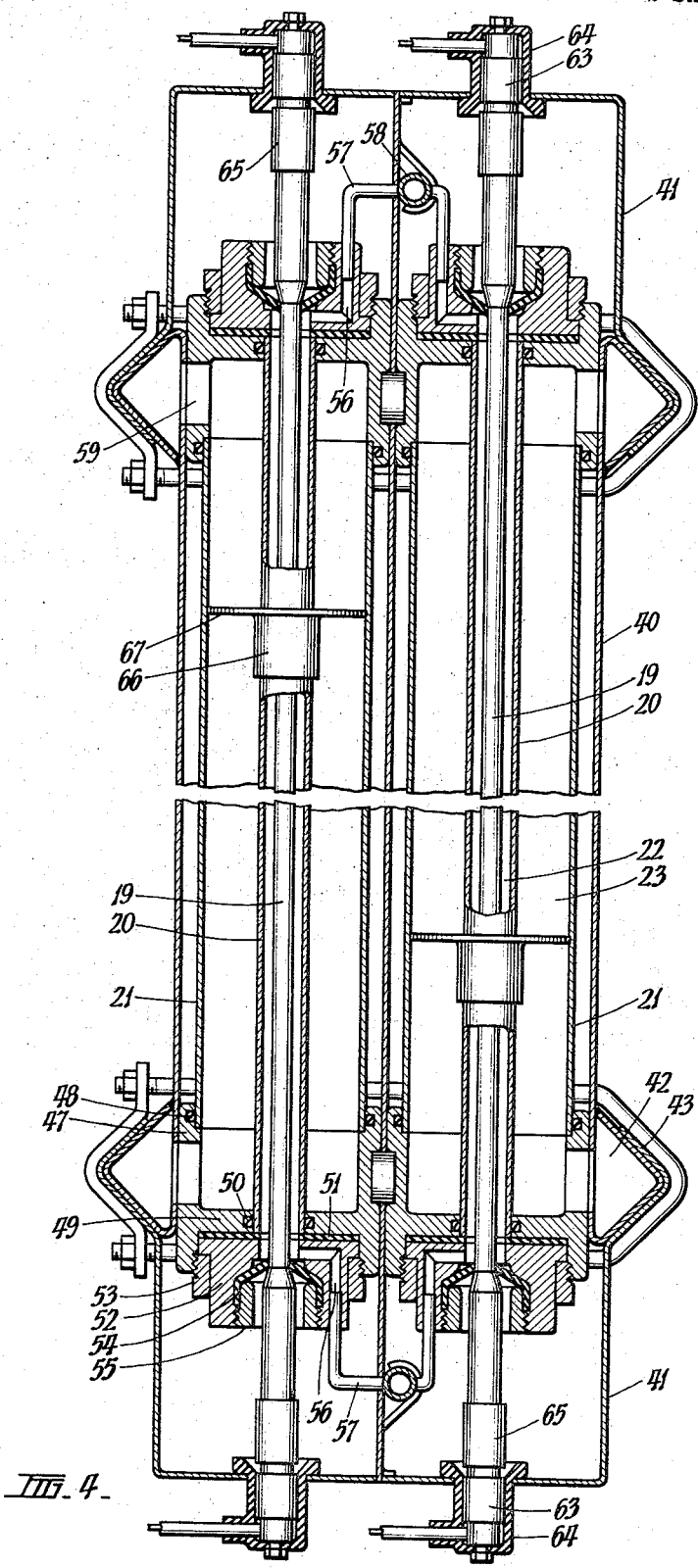

United States Patent Office 3,336,099
Patented Aug. 15, 1967

3,336,099
APPARATUS FOR THE SANITIZATION OF LIQUIDS WITH ESPECIAL APPLICATION TO WATER STORAGES AND SWIMMING POOLS
Joseph Czulak, "Greenslopes," Nepean Highway, Mount Eliza, Victoria, Australia, and Claude Edward Kawchitch, 1 Palmer St., Jolimont, Victoria, Australia
Filed Jan. 23, 1964, Ser. No. 339,779
Claims priority, application Australia, Jan. 23, 1963, 26,659/63
2 Claims. (Cl. 21—102)

This invention relates to an apparatus and method for the sanitization of liquids, with especial application to water storages and swimming pools.

It is well known that active oxygen can sanitize (partly sterilize) liquids. The sanitizing or sterilizing action results from the oxidation of living matter, e.g. micro-organisms, or other organic or even inorganic matter in the fluid by the active oxygen. For this reason, various chemical substances, e.g. sodium hypochlorite or chlorine gas, which can liberate active oxygen are employed for the sanitization of water. It is also known that the introduction of ozone, which is an unstable oxygen compound, into town water supplies and into swimming pools, for example, has a similar or better oxidising and sanitizing action because the ozone breaks down to form active oxygen atoms.

It is also well known that certain ultra-violet radiation particularly that in the so-called germicidal wave-length band, will destroy micro-organisms in air or in a liquid medium so long as the medium is relatively clear and permits the propagation of such radiation. Thus sanitization can be effected by passing the liquid near and around a source of ultra-violet radiation having germicidal activity. Hitherto, however, this method has not been used for the commercial sanitization of water due to the poor propagation of the radiation in this medium. Another well known fact is that ozone can be produced from oxygen or air in the vicinity of violent electrical discharges, particularly in the vicinity of silent electrical discharges. It is also an observed fact that when ultra-violet light is produced within a quartz tube the ultra-violet radiation will be transmitted through the tube, and, so long as oxygen or air is available in the vicinity of the tube, considerable quantities of ozone will be generated. The ozone thus produced is of value in destroying odiferous materials in air and thus ultra-violet lamps have been employed for sanitizing and deodorizing air in various locations. The sanitizing action of ultra-violet radiation under such conditions is, however, largely due to the radiation itself, as the efficiency of ozone in combatting air-borne micro-organisms is generally low and may vary considerably with atmospheric conditions of temperature and humidity.

It is an object of the present invention to combine the germicidal activities of ozone and ultra-violet radiation in a method for treating liquids in order to sanitize or sterilize such liquids.

It is also an object of the invention to provide a method and apparatus which allows the generation of ultra-violet light and ozone in required and controllable quantities, and whereby liquids may be sanitized in a more elegant manner than hitherto, without the use of chemical means which have previously been required for this purpose.

According to the invention, a method of sanitizing liquids comprises passing the liquid near and around a source of ultra-violet radiation, whereby the liquid is exposed to said radiation, and mixing the irradiated liquid with ozone generated by exposing oxygen to ultra-violet radiation.

Preferably the ozone is generated from the source of ultra-violet radiation which is used for irradiating the liquid. One form of apparatus according to the invention for carrying out this method comprises first and second chambers each containing a source of ultra-violet radiation, means for passing oxygen, or a gaseous mixture containing oxygen, through the first chamber and near and around the source of ultra-violet radiation contained therein, means for passing a liquid through the second chamber and near and around the source of ultra-violet radiation contained therein, and means for mixing and delivering the irradiated liquid and oxygen streams.

A preferred form of the apparatus comprises first and second chambers surrounding a source of ultra-violet radiation, means for passing oxygen, or a gaseous mixture containing oxygen, through the first chamber and near and around the said source, means for passing the liquid through the second chamber and near and around the said source, and means for mixing and delivering the irradiated liquid and oxygen streams.

In this construction it is further preferred the first and second chambers are formed concentrically around a tubular ultra-violet source, with the first chamber innermost and closest to the source and being defined by a wall which is transparent to ultra-violet radiation of germicidal wave-lengths.

Preferably means are also provided to filter unwanted solid material from the liquid prior to passing it through the first vessel. Preferably also means are provided to filter, dry, and cool the oxygen or gaseous mixture prior to passing it through the second chamber.

The preferred liquid is water. The gaseous mixture containing oxygen is preferably air. The method may be carried out continuously.

The effect of the ultra-violet radiation on the liquid is to destroy at least some of the micro-organisms which exist in the liquid. Exposure of oxygen to ultra-violet radiation on the other hand results in the generation of ozone. When this ozonised oxygen or air is mixed with the irradiated liquid, some of the ozone is dissolved in the water where it acts both as a germicidal and fungicidal agent and also destroys many unpleasant odiferous materials which may be present in the liquid.

To obtain the maximum benefits from this action it is of course necessary to mix the ozonised oxygen or air as thoroughly as possible with the water.

The ozonised air stream may be introduced into the stream of irradiated liquid by mixing the two streams and forcing them through a series of fine orifices or a fine mesh screen; the resulting liquid containing entrained ozone may, if desired, be introduced into a relatively large body of liquid to be sanitized, for example, a water storage or swimming pool. Alternatively, the irradiated water may be sprayed into an atmosphere of the ozonised air.

In the following description, which relates to preferred embodiments of the apparatus of the present invention, reference will be made to the accompanying drawings, in which FIGURE 1 is a diagrammatic representation of one form of the apparatus;

FIGURE 4 is a section, on an enlarged scale, along the line 4—4 in FIGURE 3.

Figure 1:
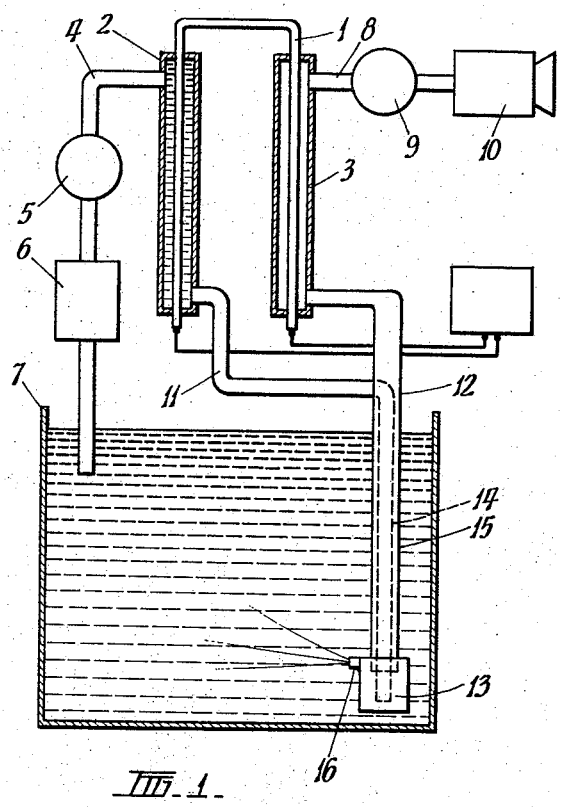

The apparatus illustrated in FIGURE 1 is suitable for the sanitization of, say, swimming pools and similar bodies of water and consists of a U-shaped ultra-violet discharge lamp 1 each arm of which is surrounded by a fluid-tight jacket 2, 3, each jacket being provided with inlet and outlet tubes. Connected to the inlet tube 4 of the jacket 2 is a liquid supply pump 5 which draws liquid from the swimming pool 7, through a filter 6. The filter 6 is preferably of a known type which has a disposable filter element.

The inlet tube 8 of the jacket 3 is connected to the output side of an air-compressor 9, the intake of which is also fitted with a filter 10 to trap dust particles and the like.

The outlets 11, 12 of the jackets 2 and 3 pass to a mixing chamber or diffuser 13 through co-axial pipes 14, 15 the water being conveyed by the inner pipe 14 and the air by the outer pipe 15.

The ozonised air and water discharged through the respective pipes 14, 15 are thoroughly and intimately mixed in passing under pressure through the mixing chamber 13 and the mixture of water (containing dissolved ozone) and excess air and ozone discharges into the pool through a nozzle 16 extending from the top section of the chamber 13.

Figure 2:
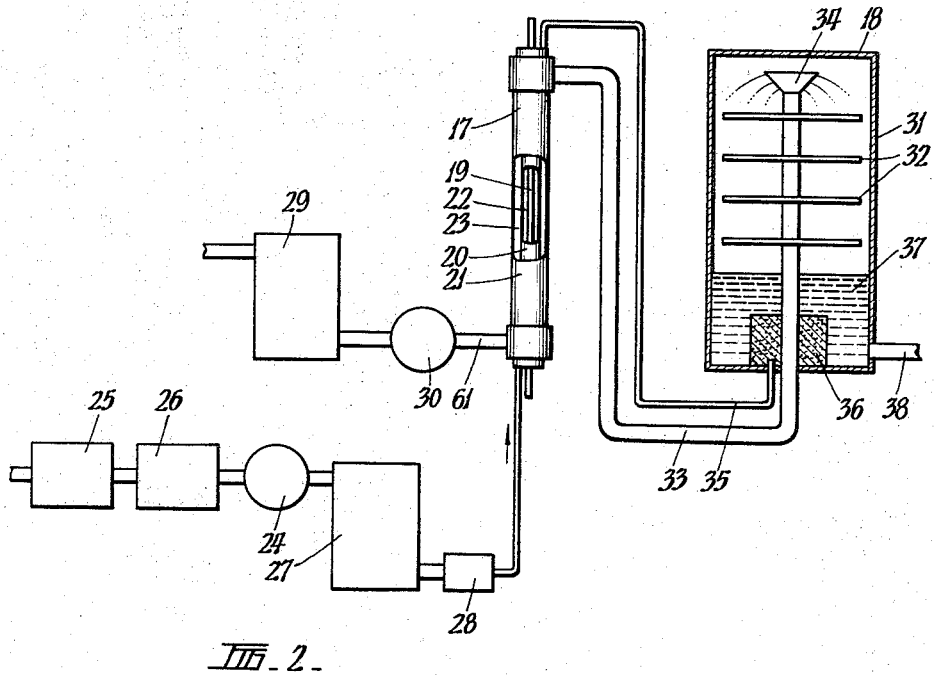
FIGURE 2 is a diagrammatic view of another form of the apparatus.

The apparatus shown in FIGURE 2 is suitable for the treatment of either fixed bodies of water, e.g. swimming pools, or a continuous flow of water as in a household or industrial water supply system. Basically the apparatus comprises an irradiation vessel 17 and an absorption vessel or washer 18. The irradiation vessel 17 is shown in part section in the figure, and comprises a tubular quartz-jacketed ultra-violet discharge lamp 19, surrounded by a quartz inner tube 20 which is coaxial with the lamp 19 and which, in turn, is surrounded by a coaxial stainless steel outer tube 21.

Fluid-tight seals are provided between the lamp 19 and the quartz tube 20 at either end and a passage is provided in each seal which communicates with the annular chamber 22 formed between the lamp 19 and the quartz tube 20. Further fluid-tight seals are provided between the ends of the outer tube 21 and the quartz tube 20. A passage is provided in each of these further seals to enable water to be passed through the annular chamber 23 formed between the quartz tube and the outer tube. The configuration of the various seals and passages referred to will be explained in detail hereinafter with reference to the practical embodiment shown in FIGURES 3 and 4.

A compressor 24 draws air through a filter 25 and a dryer 26. The compressed air is cooled in a heat exchanger 27 and then passed through an expansion valve 28 where it is further cooled. The compressed and cooled air then passes through the annular chamber 22 and thence to the absorber 18. The water to be treated passes through a filter 29 and a pump 30 and thence through the outer annular chamber 23 to the absorber 18.

The absorber 18 consists of a cylindrical vessel 31 containing a number of horizontal baffles 32. Water from the outer chamber 23 passes into the absorber through a pipe 33 which passes into and extends almost to the top of the absorber and which terminates in a spray head 34. The stream of ozonised air from the inner chamber 22 passes into the absorber via a further pipe 35 which terminates in a porous block 36 at the bottom of the absorber.

The air stream diffuses through the block 36, passes through a pool of water 37 in the bottom of the absorber 18 and fills the remaining volume of the absorber with an atmosphere of ozonised air. Ozone is absorbed by the water in the pool 37 and by the water issuing from the spray head 34 and the ozonised water then passes out of the absorber via the outlet 38.

Figure 3:
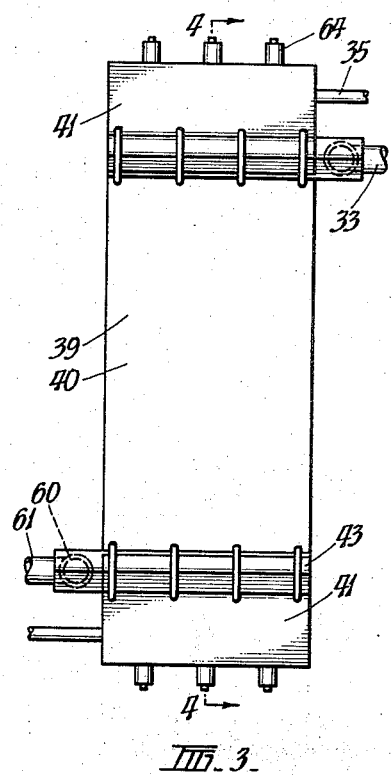
FIGURE 3 is an elevation of a practical absorption unit.

In order to allow higher water flow rates and to provide adequate irradiation of the air and water streams at such flow-rates, using tubular ultra-violet sources which are readily available, a number of irradiation vessels connected in parallel is usually employed. FIGURE 3 is a side elevation of an assembly of 6 such vessels, arranged in two banks each of three vessels and connected in parallel. FIGURE 4 is a sectional view of the assembly along the line 4—4 in FIGURE 3, and shows in detail the arrangement of the lamp and the surrounding tubes and the associated seals and inlet and outlet passages referred to above.

The assembly shown in FIGURES 3 and 4 consists of a supporting structure 39 comprising two side plates 40 and two end sections 41. A fluid-tight triangular passage 42 is formed along each of the upper and lower edges of the plates 40. A corresponding triangular flare 43 is provided on the end sections 41 which are thus located with respect to the side plates 40.

The six absorption vessels are identical and each comprises an outer stainless steel tube 21, an inner quartz tube 20 and a tubular ultra-violet lamp 19. The lamp 19 and the tubes 20 and 21 are arranged coaxially.

The outer tube 21 is sealed at each end to an end member 47 by means of an O-ring 48. The quartz tube 20 is sealed to an inwardly directed flange 49 on the end member 47 also by means of a further O-ring 50 and a washer 51. The washer 51 is held in position beneath a collar 52 and a threaded ring 53 which engages the end member 47.

The lamp 19 is sealed to the collar 52 by means of a resilient cup washer 54 and a threaded ring 55 which engages the collar 52.

The collar 52 is provided with a passage 56 which communicates with the inner annular chamber 22 formed between the lamp 19 and the quartz tube 20. A tube 57 connects the passage 56 to one of a pair of manifolds 58 by which the air stream enters and leaves the assembly.

A passage 59 in the end member 47 connects the outer annular chamber 23 with the triangular passage 42 via a hole in the side plate 40. The triangular passages 42 thus each form a manifold by which water is distributed to or collected from the outer annular chambers 23. The lower pair of water manifolds are connected by a tube 60 (FIGURE 3) and the upper pair of manifolds are similarly connected. Water enters the assembly via lower pair of manifolds through an inlet pipe 61 and leaves through an outlet pipe 33 which leads to the absorption vessel 18.

The end sections 41 carry electrical connectors 63, which are insulated from the assembly by sockets 64, and which, in operation, contact the metal end caps 65 which are connected to the internal electrodes of the lamp 19.

We have found that, even when filtered water is supplied to the irradiation vessel, the outer walls of the quartz tube 20 often become coated, during operation of the apparatus, with a deposit of a material which is relatively opaque to ultra-violet radiation. This deposit consequently greatly reduces the efficiency of the apparatus. In order to remove this deposit a cleaner 66 is provided around each of the tubes 20.

It will be apparent that modifications, other than those described, can be made to the method and process of the invention without departing from the spirit and scope thereof and it is to be understood that the invention includes all such modifications.

We claim:

1. Apparatus for sanitizing liquids comprising an elongated ultra-violet lamp, an inner duct surrounding the lamp and formed from a material which is transparent to the germicidal wave-lengths of ultra-violet light, an outer duct surrounding said inner duct, means to pass a gaseous source of oxygen through said inner duct whereby said source is irradiated and ozone is formed, means to pass a liquid through said outer duct whereby said liquid is also irradiated, an absorption vessel and means to pass the irradiated liquid and the irradiated source of oxygen to said absorption vessel.

2. An apparatus for sanitizing liquids as set forth in claim 1 further comprising cleaning means concentrically mounted on said inner duct for sliding movement thereon to remove deposits from the surface of said inner duct.

References Cited

UNITED STATES PATENTS

| | | | |
|---|---|---|---|
| 2,889,275 | 6/1959 | Moore | 210—169 X |
| 3,174,819 | 3/1965 | Clayton | 21—54 X |
| 3,182,193 | 5/1965 | Ellner et al. | 21—54 X |

JOSEPH SCOVRONEK, *Acting Primary Examiner.*

MORRIS O. WOLK, *Examiner.*

E. G. WHITBY, *Assistant Examiner.*